United States Patent [19]

Hobson, Jr. et al.

[11] 3,786,311

[45] Jan. 15, 1974

[54] CIRCUIT BREAKER AND STATIC TRIP CIRCUIT THEREFOR

[75] Inventors: Charles F. Hobson, Jr., Southington; Henry G. Willard, Wethersfield, both of Conn.

[73] Assignee: General Electric Company, New York, N.Y.

[22] Filed: Jan. 2, 1973

[21] Appl. No.: 319,977

[52] U.S. Cl........ 317/18 D, 317/33 SC, 317/36 TD, 317/38
[51] Int. Cl. ............................................. H02h 3/28
[58] Field of Search.................. 317/33 SC, 36 TD, 317/38, 18 D

[56] References Cited
UNITED STATES PATENTS

| | | | |
|---|---|---|---|
| 3,440,491 | 4/1969 | Tenenbaum et al. | 317/38 X |
| 3,666,994 | 5/1972 | Watson et al. | 317/38 X |
| 3,713,004 | 1/1973 | Skeehan et al. | 317/38 X |

*Primary Examiner*—James D. Trammell
*Attorney*—John M. Prutzman et al.

[57] ABSTRACT

A circuit breaker including separable contacts, an operating means for opening and closing the contacts and a trip coil responsive to a static control circuit for tripping the circuit breaker when instantaneous power in one of the phases of a three phase alternating current circuit exceeds adjustable predetermined levels for adjustable predetermined times as well as ground faults. A separate non-saturated iron core current transformer detects the current in each of the phases independently and powers independent cascaded current transformers having outputs of the same polarity connected to form OR circuits and provide a voltage signal correlated with the instantaneous current in a single one of the protected lines with the highest signal back biasing the others. This signal is amplified and delivered to a plurality of independent solid state adjustable time delay circuits for instantaneous time delay, short time delay and long time delay actuation of the trip coil dependent upon the extent to which the current levels in the protected line providing the signal exceeds a predetermined level of line current. Ground fault protection is also provided.

Also disclosed is a light weight power supply whose power requirements are determined by the electronic power requirements of the control circuit but nonetheless provides the power level energy needed to actuate the trip coil. The static control circuit further includes fail-safe features so that a poor circuit connection or malfunction will not render the circuit breaker inoperative.

4 Claims, 1 Drawing Figure

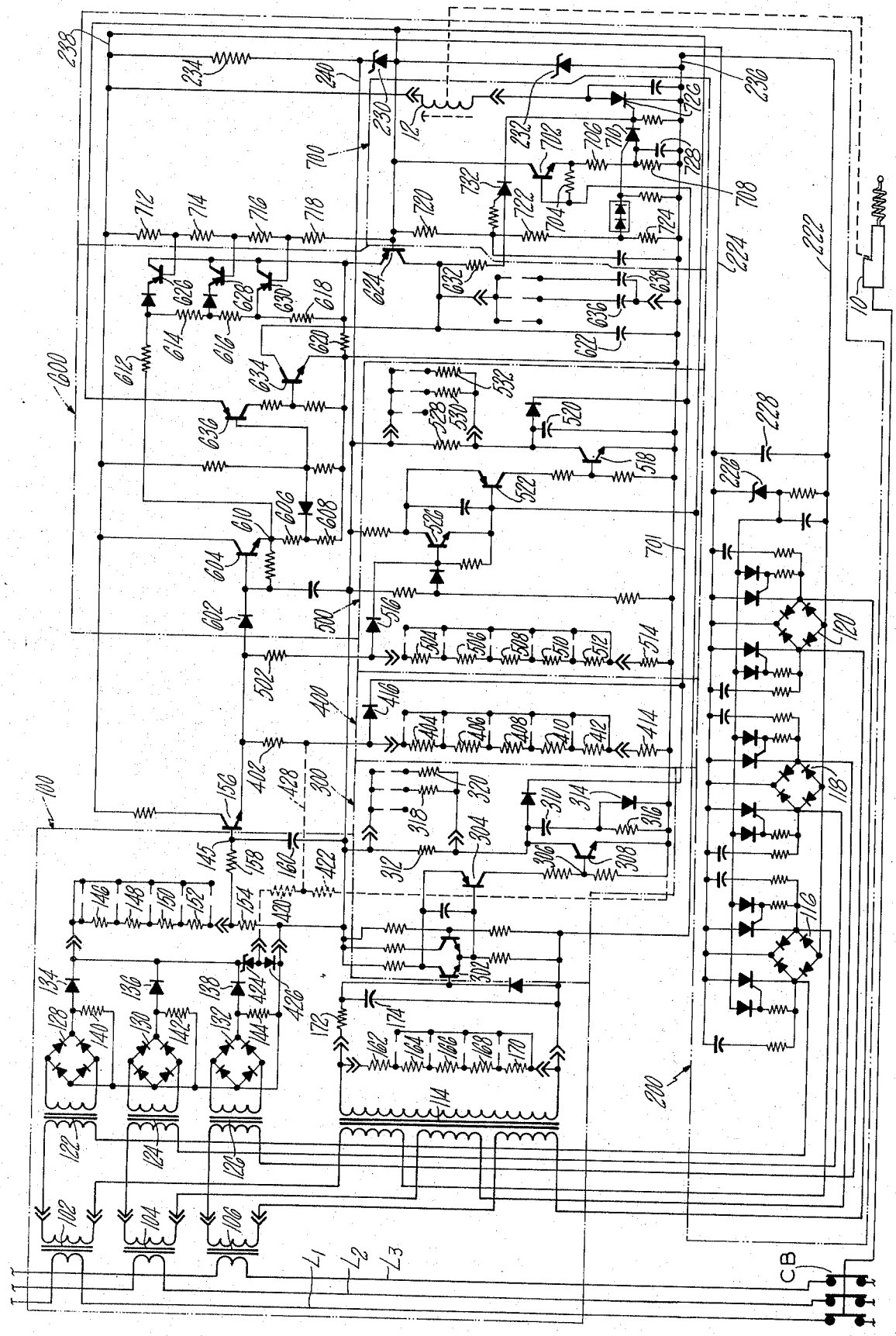

CIRCUIT BREAKER AND STATIC TRIP CIRCUIT THEREFOR

BACKGROUND AND SUMMARY OF THE INVENTION

This invention relates to circuit breakers having overcurrent and ground fault sensing circuits of the static type for controlling the operation of a trip coil for the circuit breaker.

A circuit breaker for protecting a particular circuit should be provided with an overcurrent protective device which is responsive to different current levels in the circuit to be protected to actuate a trip mechanism for the circuit breaker upon an overcurrent in the protected circuit which exceeds a predetermined current level for a predetermined interval of time which varies inversely with the current levels. The tripping mechanism should be actuated substantially instantaneously when the current level in the protected line exceeds the predetermined current level by an excessive amount of say, ten to fifteen times the predetermined current level. The control circuits should also actuate the trip mechanism of the breaker after a short time delay of say, one half second. For example, where the current in the protected line exceeds the predetermined current level of the protective line by say, six to eight times the predetermined level so that the breaker will not be tripped by a surge current imposed on the line during the starting of an electric motor but will be tripped if the current level continues. The control circuit for a circuit breaker should further safeguard the protected line and actuate the tripping mechanism of the circuit breaker where the overload current in the protected circuit exceeds a predetermined value for the circuit by, say, 5 or 10 percent where such overload condition exists for periods of time of up to, say, 10 minutes. Moreover, where the overload condition exists for too short a time to trip the breaker, the protective control circuit should automatically be reset to zero upon the disappearance of the undesired overload condition to provide the desired time delay for tripping upon the reoccurrence of the overload current.

It is further desirable that the circuit breaker be provided with ground fault protection which is coordinated with the short time delay operating characteristics of the controlled circuit. Since ground faults are normally due to the arcing of one of the phases of the protected circuits to produce an erratic condition, it is desirable to provide ground fault protection which will require more than a single arc to trip the circuit breaker, but will develop a signal to trip the circuit breaker after a short time interval if the arcing should be sustained.

Moreover, it is desirable that a single control circuit provide overcurrent and ground fault protection for each of the phases of the protected circuit individually and that the signal sensing means be highly sensitive to the current conditions in each of the circuits so that a single overcurrent protective system will trip the circuit breaker after a time interval which depends upon the occurrence of the most serious overcurrent condition in any one of the phases of the protected circuit.

Finally, it is desirable that the control circuit, the signal sensing circuit, and the power supply therefore be of minimum size and complexity and maximum reliability; and that a single control circuit be capable of controlling the trip mechanism of a circuit breaker at different predetermined current levels in the protected circuits and upon the expiration of different time delays to provide a high degree of adaptability for a wide range of current levels.

An object of this invention is to provide an improved circuit breaker and static control circuit therefor.

Other objects will be in part obvious and in part pointed out more in detail hereinafter.

These and other objectives are accomplished in accordance with the present invention by providing a circuit breaker having an improved static trip control circuit for tripping the circuit breaker upon the sensing of adjustable and variable peak current levels in an individual phase of a multiphase a.c. circuit through the use of unique signal input and power supply circuits which closely duplicate the current wave forms of the protected circuits over a wide range of current levels and load conditions and provides control level and circuit breaker tripping coil energizing power in a light weight control voltage type power supply.

A BRIEF DESCRIPTION OF THE DRAWING

In the drawing, the single FIGURE is a schematic circuit diagram for a circuit breaker incorporating the invention.

DESCRIPTION OF A PREFERRED EMBODIMENT

Referring now to the drawing, there is illustrated a three phase electrical power system, which includes the line conductors $L_1$ and $L_2$ and $L_3$, protected by an associated circuit breaker CB whose operation is controlled by a latch schematically illustrated at 10. The latch 10 is controlled by a trip coil 12 which is energized in response to the operation of the control circuit upon the sensing of a predetermined excess current level or ground fault condition in one of the line conductors of the protected circuit to open the circuit breaker CB.

The circuit breaker CB segregates or isolates the protected circuit comprising conductors $L_1$, $L_2$ and $L_3$ from the source of AC power upon the occurrence of certain abnormal or fault conditions.

In general, the illustrated sensing and static control circuit of this invention is arranged to respond the highest of the peak line currents to flow in the conductors $L_1$, $L_2$ and $L_3$ to energize the trip coil 12 and to actuate the tripping of the circuit breaker CB either instantaneously upon the occurrence of a peak line current of, say, from three to 10 times a predetermined maximum current, after a short time delay of, say, up to 0.3 seconds upon the occurrence of a peak line current which exceeds the predetermined maximum current by a lesser amount of, say, three to eight times the predetermined maximum current, and after a long time delay of, say, up to 10 minutes when the peak line current in any one of the conductors $L_1$, $L_2$ and $L_3$ exceeds the predetermined maximum current by, say, 5 to 10 percent.

As shown in the drawing, the illustrated sensing and control circuit comprises a signal sensing circuit generally indicated at 100 for generating a signal voltage proportional to the highest peak current which flows in any one of the conductors $L_1$, $L_2$ and $L_3$, a power supply circuit generally indicated at 200 for the DC bias voltages for the static control circuits as well as the power for energizing the trip coil 12 upon the occurrence of a predetermined fault condition, a ground fault control circuit 300, an instantaneous time delay control circuit 400, a short time delay control circuit 500, a long time delay control circuit 600, and an output circuit 700.

In order to obtain a plurality of output voltages which are directly proportional to the peak line currents in each of the line conductors $L_1$, $L_2$ and $L_3$ and in accordance with one aspect of this invention, a plurality of current transformers or sensors 102, 104, 106, having iron cores which are not saturated at line current levels of up to 12 times or more rated current levels for protected lines $L_1$, $L_2$ and $L_3$ are provided.

The secondary windings of current transformers 102, 104 and 106 are respectively connected in series with one of the primary windings of the ground fault signal transformer 114 and with one of the full wave rectifiers 116, 118 and 120 of the power supply circuit and with the primaries of cascaded current transformers 122, 124, 126 which are electrically and magnetically isolated and independent of each other.

The secondaries of the current transformers 122, 124 and 126 are respectively connected to full wave rectifier bridges 128, 130 and 132 to provide output current signals through burden resistors 140, 142 and 144 which are proportional respectively to the peak currents in lines $L_1$, $L_2$ and $L_3$ and generate, at the inputs of the blocking diodes 134, 136 and 138 voltages of the same polarity, but independently representative of the peak current levels in each of the protected lines $L_1$, $L_2$ and $L_3$.

The outputs of the blocking diodes 134, 136 and 138 are connected together to produce a signal at control circuit input terminal 145 which is proportional to the highest peak current in one of the conductors $L_1$, $L_2$ and $L_3$, it being understood that the diodes 134, 136 and 138 are connected to form an OR circuit wherein the highest voltage delivered by one of these diodes back biases the other two and prevents their conduction of current.

The output of the OR circuit comprising diodes 134, 136 and 140, is delivered to an adjustable voltage divider network comprising resistors 146, 148, and 150, 152, 154 in which one or more of the resistors may be shunted to attenuate the signal and establish the level of signal imposed on the base of transistor 156 by a predetermined value of current in conductors $L_1$, $L_2$ or $L_3$. The resistor 158 serves a dual function of limiting the current delivered to the base of the transistor 156 and also forms with capacitor 160 an RC circuit for rejecting high frequencies signals which may be present in the voltage divider network 146–154.

As indicated above, the secondaries of transformers 102, 104 and 106 are each connected in series with one of the primaries of transformer 114 so that unbalanced current level in lines $L_1$, $L_2$ and $L_3$ results in an unbalanced flux in transformer 114 and induces a current in its secondary. This output current is dissipated through a voltage divider comprising a string of resistors 162, 164, 166, 168 and 170 and an RC circuit comprising resistor 172 and capacitor 174 to charge capacitor 174 at a rate representative of a ground fault in one of the lines $L_1$, $L_2$ and $L_3$. In this regard, and as shown in the drawing, the string of resistors 162–170 may be selectively shunted out of the circuit to control the charging rate for the capacitor and provide an output voltage signal thereacross which corresponds with a selected level of the predetermined level of unbalance in the line currents in $L_1$, $L_2$ and $L_3$. Resistor 172 and capacitor 174 also serve as a filter for the rejection of high frequency transients so that the resultant voltage signal across capacitor 174 is directly related to the unbalance in power frequency current of the protected high lines $L_1$, $L_2$, and $L_3$.

In accordance with another aspect of this invention, the power supply 200 receives its input from the same current transformers which provide signal power for overcurrents and ground fault protection. Moreover, in addition to providing a plurality of filtered unidirectional voltages as required for biasing the solid state control circuits of the illustrated embodiment, the power supply also, despite its being lightweight and having the capacity determined by the electronic control circuit requirements, provides the source of power necessary to energize trip coil 12 to trip the circuit breaker. To achieve these ends, the current transformers 102, 104 and 106 are provided with iron cores of high permeability to accurately reproduce the current wave forms appearing in protected circuits $L_1$, $L_2$ and $L_3$ despite variations in the current level and the requirements of the power supply circuit. Moreover, the input current signals determine the level of the bias voltage on the base of transistor 156 and are isolated from the power supply through the use of separate cascaded iron core current transformers 122, 124, 126 for the current signals whereas the power supply is powered with separate and independent full wave rectifiers 116, 118 and 120. As is apparent from the drawing, the power supply provides a regulated voltage output across lines 222 and 224 with zener diode 226, serving to fix the voltage differential between these output terminals and capacitor 228 functioning as a smoothing filter for the control voltages.

As shown, zener diodes 230 and 232 are connected in series with resistors 234, to form a voltage divider network for providing the different levels of voltage required in the control circuit with bus 236 being at zero voltage, bus 238 at maximum control voltage, say, about 48 volts and bus 240 being at an intermediate voltage, say, about 18 volts.

As hereinafter is more fully described, capacitor 228 in addition to serving as a smoothing or filtering capacitor for the electronic power supply also serves as a source of energy for the trip coil 12.

As previously indicated, the input signal circuit 100 delivers a pulsating voltage signal corresponding to the current condition existing in that phase of the three phase circuit having the highest instantaneous current level to the base of NPN transistor 156.

Transistor 156 is connected as an emitter-follower and serves as a current amlifier of the input signal. The emitter of transistor 156 is connected to instantaneous time delay control circuit 400 through a resistor 402 which is connected to ground bus 236 through an adjustable voltage divider network comprising resistors 404 to 414. It will be noted that these resistors may be selectively shunted out of the circuit to adjust the tripping level of the trip coil 12 of from, say, three to ten times rated instantaneous current in one of the protected lines $L_1$, $L_2$, $L_3$.

A diode 416 is connected to a junction between resistor 402 and the adjustable voltage divider network comprising resistors 404 and 414. The current through diode 416 flows through conductor 701 to the base of NPN transistor 702 to ground through resistance network 704, 706, and 708. Transistor 702 is connected as an emitter-follower and when the voltage signal at the base of transistor 702 reaches a level of approximately 12 volts with respect to ground, indicative of a very high instantaneous current in one of the protected conductors L₁, L₂ or L₃, the anode voltage of programable unijunction transistor (PUT) 710, which is connected to a junction between resistors 706 and 708 is also raised to a level slightly higher than its gate voltage.

The gate of PUT 710 is connected to a junction of a voltage divider network comprising resistors 720, 722 and 724 to establish a fixed gate voltage for PUT 710. When the anode voltage of PUT 710 exceeds its gate voltage, the PUT is fired to trigger SCR 726 to energize trip coil 12, which is preferably of the design of Willard U.S. Pat. No. 3,693,122. In this regard, it will be noted that the capacitor 228 of the power supply 200 is connected to deliver its stored energy to trip coil 12 and it has the capacity of providing a one ampere pulse sufficient to energize the trip coil to trip the latch 10.

The conduction of transistor 702 also charges the capacitor 728 to maintain the anode voltage of PUT 710 at a sufficient level to maintain it in its conducting state although transistor 702 ceases to conduct.

Essentially, no time delay is provided in the instantaneous time delay circuit, as described above so that, immediately upon the biasing voltage of transistor 702 reaching a triggering level for PUT 710, the energization of trip coil 12 is substantially simultaneous.

If desired, the adjustable instantaneous time delay circuit 400 may be replaced by a fixed instantaneous override circuit as shown in dashed lines. A fixed voltage divider comprising resistors 420, 422 connected to a terminal between zener diode 424 and oppositely poled diode 426 is connected to diode 416 by lead 428. Resistors 402, and 404-412, are also eliminated along with any circuit connection with the output of transistor 156.

Where zener diode 424 is set to conduct at, say, 15 to 25 times maximum rated current in L₁, L₂, and L₃, transistor 702 is biased to conduction when this level is reached.

The output signal of transistor 156 is also fed to short time delay circuit 500 through a resistor 502 which is connected to ground bus 236 through an adjustable voltage divider comprising resistors 504, 506, 608, 510, 512, and 514 which may be selectively shunted out of the circuit to provide a current signal to diode 516, which corresponds to a multiple of the rated peak current in any of the three phases of L₁, L₂, and L₃, say, for example, from three to ten times the rated current. The short time delay circuit includes a NPN transistor 518 which is connected across intermediate bus 240 and the ground bus 236 and is normally on the ON position to clamp the time delay capacitor 520 to zero voltage. PNP transistor 522 is also gated to the ON position.

In the event that the output signal of transistor 156 becomes sufficient to produce a voltage across voltage divider 504-514 to cause a current flow through diode 516 and increase the voltage applied to the base of transistor 526 above the positive fixed voltage level of its emitter, the transistor 526 is gated to its conductive state which turns off the transistor 522 which in turn renders the transistor 518 non-conductive. When transistor 518 is non-conductive, the voltage of intermediate bus 240 is imposed across the charging circuit for capacitor 520.

In the event that the build-up of voltage across the capacitor 520 continues for a sufficient period of time to build-up a voltage sufficient to fire PUT 710 as hereinbefore described in connection with the instantaneous time delay control circuit, SCR 726 is rendered conductive and the tripping coil 12 energized to trip the latch 10 to open the circuit breaker CB.

It will be noted that the charging circuit for capacitor 520 includes resistor 528 which regulates the charging rate for the capacitor. Resistor 528 can be selectively paralleled with resistors 530 and 532 to adjust the time delay for any period of time, say, from six to 18 cycles to enable a downstream circuit breaker, if any, to open prior to the opening of the circuit breaker CB.

A single low peak in the instantaneous current in the protected conductor L₁, L₂, or L₃ responsible for the overcurrent condition responsible for the output of transistor 156 will render transistor 522 conductive. This in turn renders transistor 518 conductive to dump the charge in capacitor 520 so that the time delay provided by capacitor 520 is reset to zero.

The output of transistor 156 further provides an input signal to long time delay circuit 600 through an isolating diode 602 from whence it is delivered to NPN transistor 604 which is connected as an emitter follower to provide a second stage of current amplification. With transistor 604 in a conductive state, current flows from positive bus 238 through transistor 604, and a voltage divider comprising resistors 606 and 608 to ground bus 236. This current output of transistor 604 is proportional to the peak current of the phase of the protected conductors comprising lines L₁, L₂ and L₃ responsible for the overload condition being sensed and is fed to the voltage divider network comprising resistors 612, 614, 616, 618, and 620 which are connected between terminal 610 of transistor 604 and ground bus 236.

The output from the emitter of emitter-follower transistor 604 provides a charging current for capacitor 622 through a capacitor charging network including resistor 612, 614, 616, 618 and PNP transistor 624. The PNP transistors 626, 628, and 630, together with the voltage divider network comprising resistors 712, 714, 716 and 718 serve as a non-linear voltage charging network for capacitor 622 so that the charging rate of capacitor 622 increases as the square of the overload current in the one of the protected conductors L₁, L₂, L₃ responsible for the overload condition being sensed by transistor 156. In this regard, the emitter voltages of transistors 626, 628 and 630 increase as the emitter voltage of transistor 156 increases with increasing overcurrent until transistor 630 is gated to conduction. Thereafter, the emitter voltage of transistor 630 cannot increase and the current flow through resistor 618 cannot increase further. As the emitter voltage of transistor 156 further increases, first the emitter voltage of transistor 628 and then of 626 increase so that the current flow through resistor 616 and 614 is sequentially fixed and cannot increase further. By properly proportioning the resistors 612, 614, 616, 618, and 620, the charging current for capacitor 622 can approximate the square of the signal to transistor 156. When the voltage across capacitor 622 is imposed on the gate of programable unijunction transistor (PUT) 732 through current limiting resistor 632 and reaches the level above the voltage at the gate of PUT 732, PUT 732 is triggered to fire SCR 726 and energize trip coil 12.

As shown, capacitors 636 and 638 may be selectively connected in parallel with capacitor 622 to vary the charging period to up to, say, about 10 minutes.

If the overload current being sensed drops below a predetermined level, capacitor 622 is immediately discharged by being clamped to ground through NPN transistor 634, which is normally ON but is rendered non-conductive by the non-conduction of PNP transistor 636. Transistor 636 is biased to its conductive state in the absence of overcurrent conditions and is biased to its non-conductive state by overcurrents.

The ground fault circuit 300 also controls the energization of trip coil 12 upon a predetermined level of unbalance in the current in protected conductors $L_1$, $L_2$, and $L_3$ which produces a current in the secondary of transformer 114. The voltage divider network across the secondary of transformer 114 determines the voltage across capacitor 174. When the voltage across the capacitor 174 reaches a predetermined level as determined by the value of resistors connected in the circuit, a positive signal on the base of NPN transistor 302 gates the transistor into conduction. This reduces the emitter voltage on PNP transistor 304 to change it from a conducting to a non-conducting state to shift the voltage at junction 306 and the base of NPN transistor 308 to ground voltage level to turn the transistor 308 off. Since transistor 308 serves to clamp capacitor 310 to ground when conducting, this allows capacitor 310 to be charged through resistor 312, with diode 314 allowing the charge to take place at a fast rate. When the voltage across capacitor 310 reaches a level sufficient to trigger PUT 710 to fire the SCR 726 to energize trip coil 12 as in the case of the short time delay circuit previously described.

Ground faults are frequently erratic and are the result of arcing one of the phases. In order to provide a ground fault protector which will operate when there is a full short, but will not operate when the arcing is of a transient or short term nature, the discharge circuit for capacitor 310 provides for the bleeding of the charge on capacitor 310 as well as for the accumulation of the charge if the arcing should be repeated.

A dumping circuit for capacitor 310 comprises the resistor 316 and the transistor 308 which is normally in its conductive state in the absence of a ground fault. Since resistor 316 controls the rate of discharge of capacitor 310, a repetition of arcing of a given intensity within a predetermined period of time will result in the build-up of the voltage across capacitor 310 to a level to trigger the trip coil 12. However, where the ground fault disappears transistor 304 is rendered conductive to raise the base voltage of transistor 308 to render transistor 308 conductive and discharge capacitor 310 to reset the timing circuit to zero. Resistors 318 and 320 may be selectively connected in parallel with resistor 312 to reduce the time delay of the circuit.

From the foregoing, it will be apparent that this invention provides an efficient, adaptable, reliable, circuit breaker having solid state time delay circuits which are adjustable to provide different time delays and different current levels for tripping the circuit breaker, as well as a novel power supply and signal sensing circuit of high discrimination and sensitivity with respect to the most serious overcurrent condition occuring in any one of the protected phases of a polyphase power circuit.

It is further apparent that the use of resistors and capacitors of fixed value, i.e., resistors 146-154, resistors 162-170, resistors 318, 320, resistors 404-414, resistors 504-514, resistors 530, 532, and capacitors 636, 638, provide voltage divider and capacitor charging networks in which field adjustable trip current levels and trip time delays may be set at precise settings and with repeatable tripping accuracy for precise coordination with other circuit breakers in a wide range of applications and ratings without changing the trip unit. Moreover, these adjustments are incorporated in the control circuits in such a manner that even if a poor connection inadvertently is present following an adjustment, the circuit breaker will nonetheless be set a fixed current tripping and time delay level.

As will be apparent to persons skilled in the art, various modifications, adaptations, and variations of the foregoing specific disclosure can be made without departing from the teachings of the present invention.

We claim:

1. In a circuit breaker for protecting a polyphase circuit comprising separable contacts, operating means for opening and closing said contacts, a latch for maintaining said contacts in their closed position, a trip coil for tripping said latch, and a control circuit for energizing said trip coil upon the occurrence of a predetermined condition in any one of the phases; said control circuit including:
   A. overcurrent detection circuitry for independently detecting an overcurrent condition in each phase;
   B. ground fault protection circuitry for detecting a fault condition on any of the phases;
   C. power supply circuitry having a separate input per phase and a common output;
   D. a separate first current transformer coupled with each phase, each said first transformer having a secondary winding for developing an output current proportional to the current flowing in the associated phase;
   E. a separate second current transformer for each phase, each said second transformer having a primary winding and a secondary winding providing a discrete input to said overcurrent protection circuitry;
   F. a third current transformer having a primary winding per phase and a common secondary winding coupled to the input of said ground fault protection circuitry, and
   G. means connecting together in separate series circuits different ones of said first transformer secondary windings, said second transformer primary windings, said third transformer primary windings and said power supply inputs.

2. The combination defined in claim 1, wherein said primary windings of said third transformer are wound in differential current transformer fashion, whereby the current induced in said secondary winding thereof is the result of unbalanced currents flowing in said separate series circuits.

3. The combination defined in claim 2, wherein said overcurrent detection circuitry includes means for deriving a single output signal indicative of the current in the phase experiencing the most serious overcurrent condition, said control circuit including means interconnecting said overcurrent protection circuitry and said power supply circuitry for referencing said output signal to a predetermined power supply voltage at said common output.

4. The combination defined in claim 3 wherein said overcurrent detection circuitry includes a separate rectifying network connected with each said second transformer secondary winding, and each said power supply circuitry input includes a separate rectifying network included in each said series circuit.

* * * * *